US012668305B2

(12) United States Patent
Murahashi

(10) Patent No.: US 12,668,305 B2
(45) **Date of Patent: *Jun. 30, 2026**

(54) COMPUTATION APPARATUS AND VEHICLE

(71) Applicant: HONDA MOTOR CO., LTD., Tokyo (JP)

(72) Inventor: Yoshimitsu Murahashi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 286 days.

This patent is subject to a terminal disclaimer.

(21) Appl. No.: 18/423,410

(22) Filed: Jan. 26, 2024

(65) Prior Publication Data

US 2024/0262421 A1 Aug. 8, 2024

(30) Foreign Application Priority Data

Feb. 2, 2023 (JP) ................................. 2023-014849

(51) Int. Cl.
*B62D 15/02* (2006.01)
*B60W 10/20* (2006.01)
*B60W 60/00* (2020.01)

(52) U.S. Cl.
CPC ........... *B62D 15/025* (2013.01); *B60W 10/20* (2013.01); *B60W 60/001* (2020.02); *B60W 2552/53* (2020.02); *B60W 2554/4041* (2020.02); *B60W 2555/60* (2020.02)

(58) Field of Classification Search
CPC ....... B62D 15/025; B62D 6/00; B60W 10/20; B60W 60/001; B60W 2552/53; B60W 2554/4041; B60W 2555/60
See application file for complete search history.

(56) References Cited

U.S. PATENT DOCUMENTS

| | | | | |
|---|---|---|---|---|
| 12,365,360 B2 * | 7/2025 | Kato | ................... | G01C 21/3415 |
| 2020/0001883 A1 * | 1/2020 | Jung | ........................ | B60Q 1/34 |
| 2021/0253166 A1 | 8/2021 | Tomoi | | |
| 2021/0394828 A1 * | 12/2021 | Audino | ................ | B62D 15/025 |
| 2022/0234627 A1 * | 7/2022 | Juel | ..................... | G06Q 30/0205 |
| 2022/0292971 A1 * | 9/2022 | Park | ..................... | G06V 20/586 |
| 2023/0041498 A1 * | 2/2023 | Weston | ............. | B60W 60/0025 |

(Continued)

FOREIGN PATENT DOCUMENTS

JP 2021-127077 A 9/2021

*Primary Examiner* — Donald J Wallace

(57) ABSTRACT

An on-vehicle computation apparatus, comprising a first detection unit configured to detect a travelable route on which a self-vehicle is travelable, a second detection unit configured to detect a driving operation input to the self-vehicle, the driving operation including a steering operation, a steering assist unit configured to assist the steering operation so that the self-vehicle travels along the travelable route detected by the first detection unit, a specification unit configured to specify one of two or more travelable routes based on the driving operation, when the two or more travelable routes are detected by the first detection unit, and a control unit configured to control the steering assist unit and to, when the two or more travelable routes are detected by the first detection unit, suppress the assist by the steering assist unit until one of the two or more travelable routes is specified by the specification unit.

14 Claims, 7 Drawing Sheets

(56)     References Cited

U.S. PATENT DOCUMENTS

| | | | |
|---|---|---|---|
| 2023/0278553 A1* | 9/2023 | Kraft ..................... | B60W 10/18 |
| | | | 701/26 |
| 2023/0311885 A1* | 10/2023 | Doi ................... | B60W 50/0097 |
| | | | 701/70 |
| 2024/0367672 A1* | 11/2024 | Stockinger .......... | G08G 1/0112 |

* cited by examiner

F I G. 2
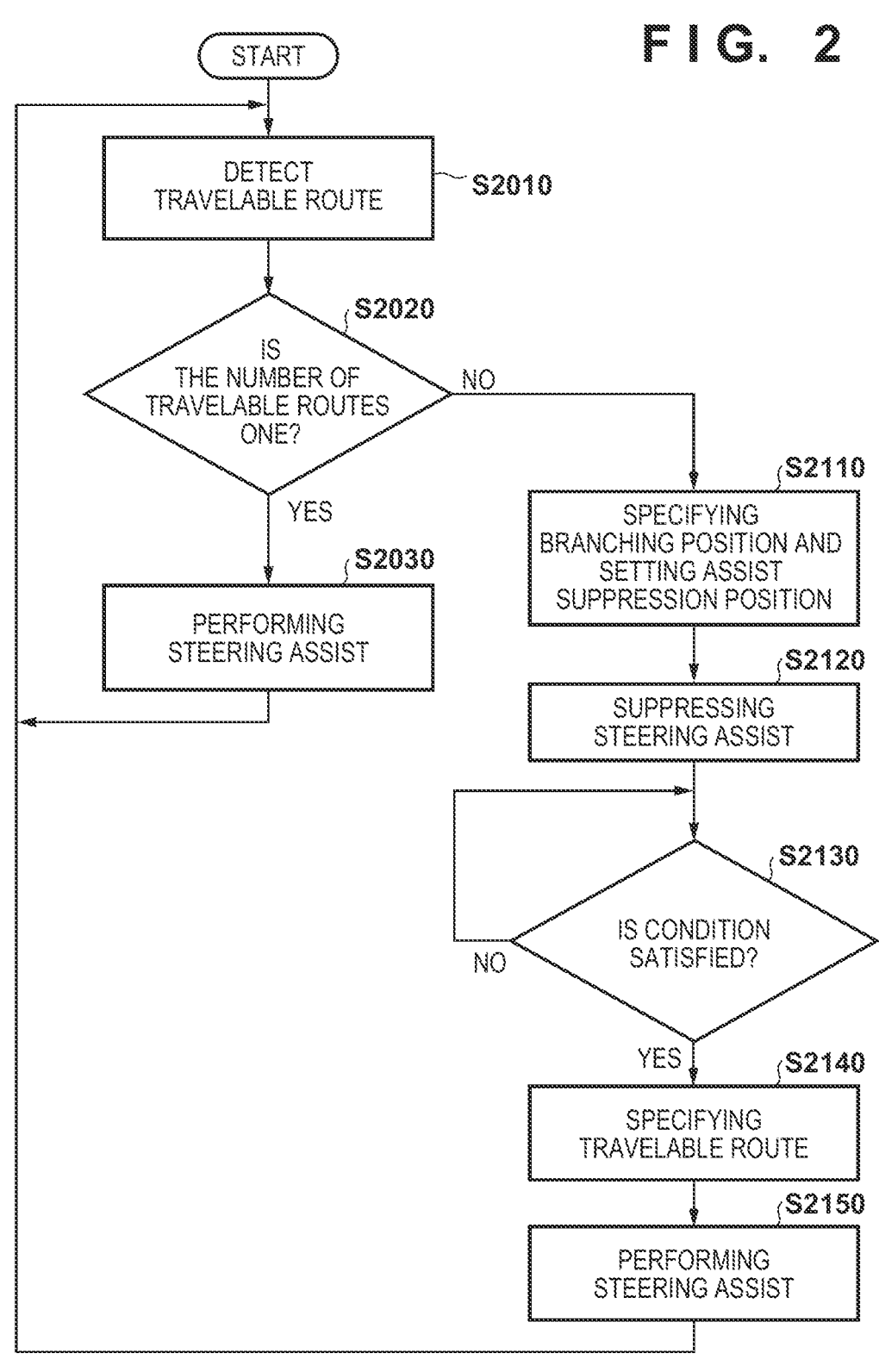

COMPUTATION APPARATUS AND VEHICLE

CROSS-REFERENCE TO RELATED APPLICATION(S)

This application claims priority to and the benefit of Japanese Patent Application No. 2023-014849, filed on Feb. 2, 2023, the entire disclosure of which is incorporated herein by reference.

BACKGROUND OF THE INVENTION

Field of the Invention

The present invention mainly relates to an on-vehicle computation apparatus.

Description of the Related Art

Among vehicles having a driving support function, which is also referred to as automated driving or the like, some vehicles assist a steering operation by an ECU so that traveling of a self-vehicle on a predetermined lane is maintained (see Japanese Patent Laid-Open No. 2021-127077).

In a case where a traveling route branches into two or more sections, it is conceivable that the steering operation assisted by the ECU is different from that intended by a driver, and in such a case, a burden of the driving operation by the driver may be increased.

SUMMARY OF THE INVENTION

An exemplary object of the present invention is to reduce a burden of a driving operation by a driver.

One of the aspects of the present invention provides an on-vehicle computation apparatus, comprising a first detection unit configured to detect a travelable route on which a self-vehicle is travelable, a second detection unit configured to detect a driving operation input to the self-vehicle, the driving operation including a steering operation, a steering assist unit configured to assist the steering operation so that the self-vehicle travels along the travelable route detected by the first detection unit, a specification unit configured to specify one of two or more travelable routes based on the driving operation, when the two or more travelable routes are detected by the first detection unit, and a control unit configured to control the steering assist unit and to, when the two or more travelable routes are detected by the first detection unit, suppress the assist by the steering assist unit until one of the two or more travelable routes is specified by the specification unit.

Further features of the present invention will become apparent from the following description of exemplary embodiments (with reference to the attached drawings).

BRIEF DESCRIPTION OF THE DRAWINGS

FIG. 2 is a flowchart illustrating an example of content of computational processing for performing steering assist;

FIG. 3A is a schematic top view illustrating an example of a branching mode of a travelable route;

FIG. 3B is a schematic top view illustrating an example of a branching mode of a travelable route;

FIG. 3C is a schematic top view illustrating an example of a branching mode of a travelable route;

FIG. 6 is a schematic top view of a traveling environment including a left-turn channel; and FIG. 7 is a schematic top view of a traveling environment including a drive-through.

DESCRIPTION OF THE EMBODIMENTS

Figure 1:
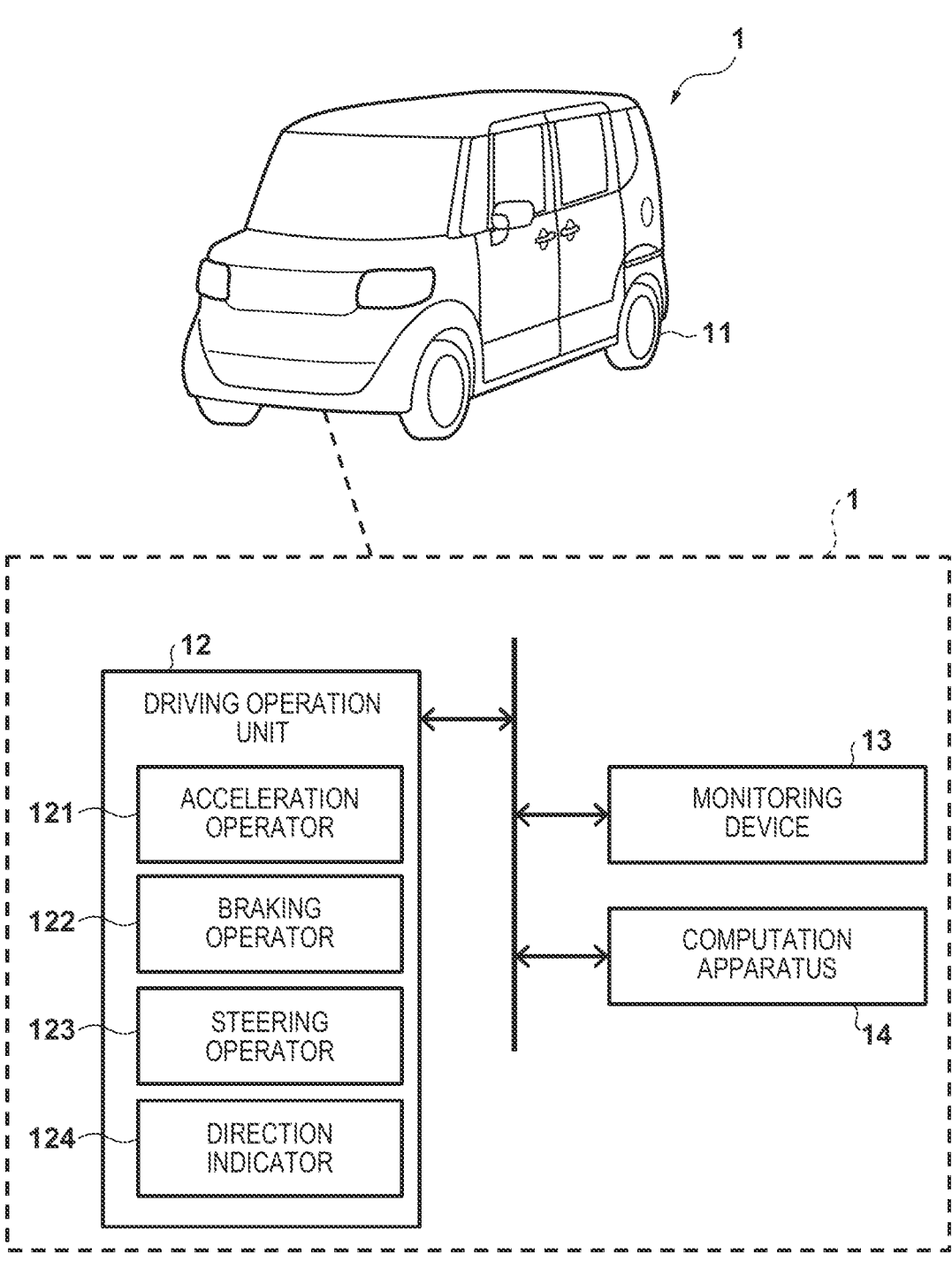
FIG. 1 is a perspective view illustrating an example of a vehicle according to an embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

(Configuration Example of Vehicle)

FIG. 1 is a perspective view illustrating an example of a vehicle 1 according to an embodiment. The vehicle 1 includes wheels 11, a driving operation unit 12, a monitoring device 13, and a computation apparatus 14. The vehicle 1 is a four-wheeled vehicle including a total of four wheels 11 of two front wheels and two rear wheels in the present embodiment, but may be a two-wheeled vehicle as another embodiment, and the number of wheels is not limited to this example.

The driving operation unit 12 includes an acceleration operator 121, a braking operator 122, and a steering operator 123. The acceleration operator 121 is an operator for performing an acceleration operation, and an accelerator pedal can be typically used. The braking operator 122 is an operator for performing a braking operation, and a brake pedal can be typically used. The steering operator 123 is an operator for performing a steering operation, and a steering wheel can be typically used. Note that other known operators such as switches and levers may be used as these operators.

The driving operation unit 12 further includes a direction indicator 124 as another operator capable of realizing an accompanying driving operation. At the time of changing a traveling direction of the self-vehicle 1, for example, turning to the left, turning to the right, turning to the side, or the like, a driver inputs an operation indicating the change to the direction indicator 124. In general, when the operation is input to the direction indicator 124, a corresponding lighting device can blink. The operation performed on the direction indicator 124 may also be expressed as a direction indication operation.

The monitoring device 13 is configured to be able to monitor or detect a traveling environment of the self-vehicle 1, and in the present embodiment, a camera including a CCD/CMOS image sensor or the like is used. The example of the monitoring device 13 is not limited thereto, and other known devices such as a millimeter wave radar and a light detection and ranging (LiDAR) may be used alternatively/incidentally.

The concept of the traveling environment includes information necessary for realizing and maintaining appropriate traveling of the self-vehicle, such as a road environment and presence or absence of an object. Examples of the road environment include a physically travelable area, a line (division line, for example, a lane boundary line attached to divide two adjacent lanes from each other) attached to the area, a marking (road marking) attached to the area, a sign (road sign) that can be generally installed on the side of the area or above the area, and the like. Examples of the object include another vehicle, a building, an installed object, another obstacle that should avoid contact with the self-vehicle, and the like.

The computation apparatus 14 is configured to be capable of executing computational processing for controlling the entire system of the vehicle 1, and is capable of mutually communicating with the driving operation unit 12, the monitoring device 13, and other elements (not illustrated). For example, the computation apparatus 14 acquires a traveling environment of the vehicle 1 as image data by the monitoring device 13, and enables execution of predetermined driving support based on a result of image analysis of the image data. The concept of driving support includes at least partially performing at least one of an acceleration operation, a braking operation, and a steering operation in place of the driver, and a mode in which the computation apparatus 14 performs all of the acceleration operation, the braking operation, and the steering operation may also be referred to as fully automated driving.

As the computation apparatus 14, one or more known electronic control units (ECUs) may be used. For example, in the ECU, a processor executes a program for performing the driving support while developing the program on a memory, so that a corresponding driving support function can be realized. Note that a part or all of the driving support function may be realized by an application specific integrated circuit (ASIC), that is, the driving support function exemplified herein may be realized by either hardware or software.

With such a configuration, the vehicle 1 having the driving support function can be realized, and in the present embodiment, the computation apparatus 14 performs the steering operation in an auxiliary manner. The auxiliary mentioned herein indicates that the main steering operation is performed by the driver, the steering operation by the computation apparatus 14 assists the steering operation by the driver, and the steering operation by the driver can intervene in the steering operation by the computation apparatus 14. Such an auxiliary steering operation by the computation apparatus 14 may be expressed as steering operation support, steering operation assist, or simply steering assist (in the following description, it is referred to as the "steering assist").

Such steering assist is used to appropriately realize and maintain traveling of the self-vehicle 1 in a center portion between a left division line and a right division line that divide the lane. Such a system capable of realizing driving support is also referred to as a lane keep assist system (LKAS), which allows the self-vehicle 1 to travel along a lane extending substantially in one traveling direction.

For example, the computation apparatus 14 performs steering assist while mainly detecting a division line by the monitoring device 13 on a general road, and suppresses the steering assist in an area (for example, an intersection or the like) where the division line is not detected.

Further, when the self-vehicle 1 is traveling on a general road including two or more lanes, the computation apparatus 14 performs the steering assist so as to maintain one of the two or more lanes on which the self-vehicle 1 is traveling, and although details will be described later, when the direction indication operation is performed on the direction indicator 124, the computation apparatus 14 changes content of the steering assist so as to realize a lane change to a side corresponding to the operation.

On the other hand, when a steering operation, which is the steering operation by the driver different from the steering operation by the computation apparatus 14 and has an operation amount (mainly operation torque) larger than that by the computation apparatus 14 by a reference value or more, is input to the driving operation unit 12 (mainly the steering operator 123) without performing the direction indication operation on the direction indicator 124, the computation apparatus 14 suppresses the steering assist on the assumption that the steering assist is different from the driver's intention.

(Steering Assist)

FIG. 2 is a flowchart illustrating an example of content of computational processing by the computation apparatus 14 for performing steering assist according to the present embodiment. This flowchart is mainly executed by the computation apparatus 14, and an outline thereof is to suppress the steering assist until one of two or more travelable routes generated by branching of the travelable route is specified when the branching of the travelable route is detected. Note that this flowchart may be started when the driving support function is active, and may be ended when the driving support function is inactive.

In step S2010 (hereinafter, simply referred to as "S2010". The same applies to other steps described later), image analysis is performed on the image data acquired by the monitoring device 13 to detect a travelable route. It is assumed that the image data indicates a traveling environment of the self-vehicle 1, and is periodically acquired and updated as a monitoring result by the monitoring device 13.

Here, it is assumed that the travelable route is a route for determining one traveling direction of the self-vehicle 1 thereafter. For example, in a case of a single-lane road without lane branching, since there is one traveling direction of the self-vehicle 1, a single travelable route is detected. On the other hand, in a case where the lane branches into two or more sections, or in a case where two or more traveling direction candidates are generated even if the lane is a single lane, it is detected that the travelable route branches into two or more sections.

In addition, it is assumed that a route involving simple lateral position adjustment for the self-vehicle 1 to maintain traveling in a center portion of the lane is included in one travelable route. For the same purpose, it is assumed that a route involving a simple detour for avoiding contact between the self-vehicle 1 and an object is included in one travelable route. That is, the travelable route may have a predetermined width for the self-vehicle 1 to travel substantially in one direction and realize and maintain appropriate traveling.

From such a viewpoint, the travelable route may be expressed as a traveling route candidate or the like.

Such travelable routes and branches thereof can be detected based on any element indicated by the image data acquired by the monitoring device 13, and can typically be detected based on road signs and/or road markings. As another example, the travelable routes and branches thereof may be detected based on a lane width on which the self-vehicle 1 is traveling and/or based on a traveling mode of one or more other vehicles (preceding vehicles) traveling in front of the self-vehicle.

Figures 3A, 3B, 3C:
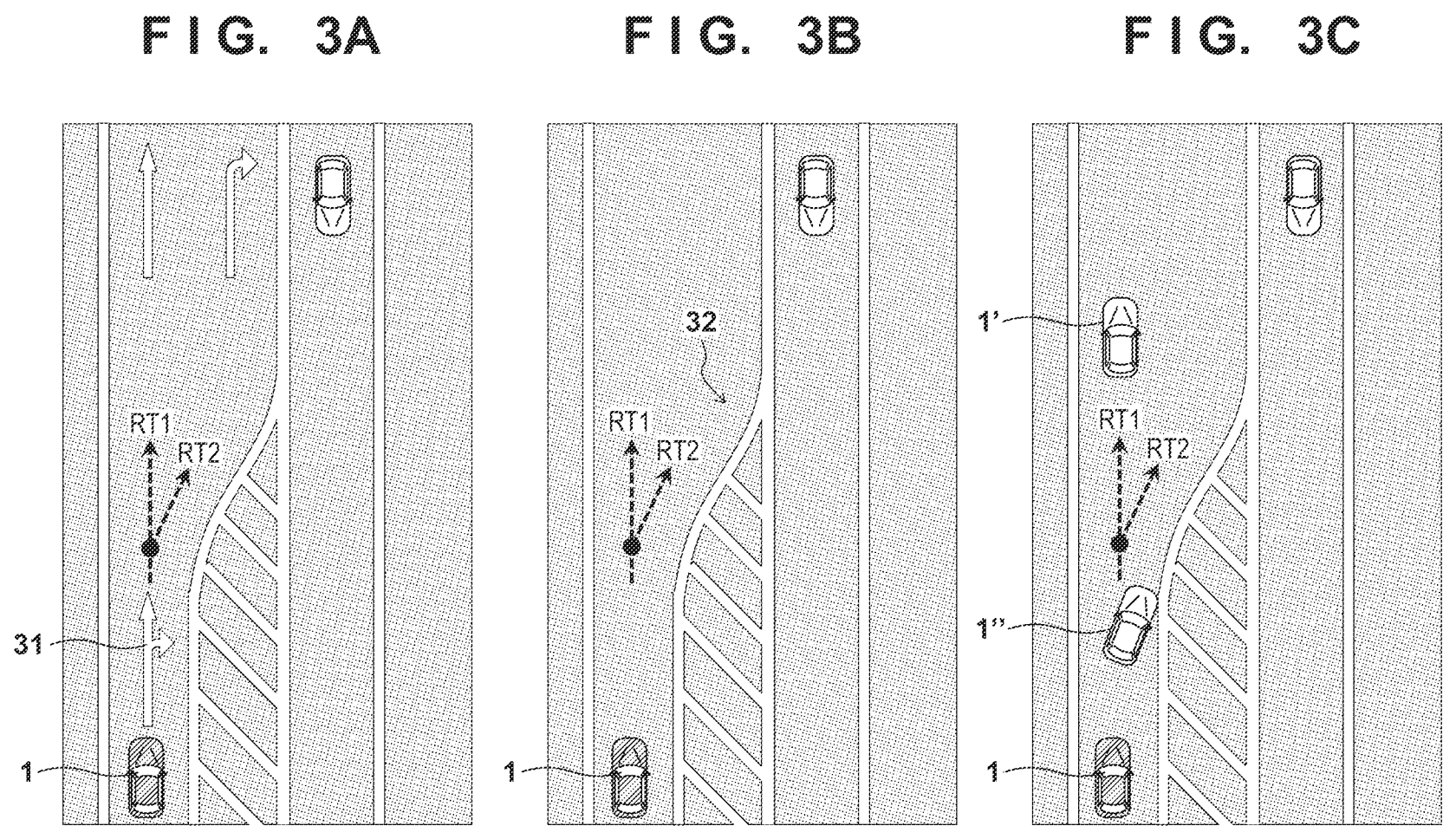

FIG. 3A illustrates a mode in which, when image data indicates a road marking 31 of an arrow indicating a straight line and a right-turn branch, it is detected that a travelable route branches into a route RT1 for a straight line and a route RT2 for a right turn. Although the road marking is exemplified here, the same applies to the road sign, that is, one or more travelable routes can be detected based on the road sign and/or the road marking.

FIG. 3B illustrates a mode in which, when image data indicates a mode 32 in which a lane width increases rightward, it is detected that a travelable route branches into a route RT1 for a straight line and a route RT2 for a right turn. That is, one or more travelable routes can be detected based on the lane width. In this example, the routes RT1 and RT2 are detected even if the road marking 31 is not indicated by the image data.

FIG. 3C illustrates a mode in which, when image data indicates that one (for example, a vehicle 1') of two or more preceding vehicles goes straight and the other (for example, a vehicle 1") moves to the right or turns right, it is detected that a travelable route branches into a route RT1 for a straight line and a route RT2 for a right turn. That is, one or more travelable routes can be detected based on the behavior of the preceding vehicle. In this example, the routes RT1 and RT2 are detected before the road marking 31 and/or the mode 32 are indicated by the image data.

Referring again to FIG. 2, in S2020, it is determined whether or not the number of travelable routes detected in S2010 is 1. When the number of travelable routes is 1, the process proceeds to S2030 (Yes determination), and when the number of travelable routes is 2 or more, the process proceeds to S2110 (No determination). Note that, in a case where the travelable route disappears, this flowchart is ended assuming that the vehicle 1 cannot travel, and it can be incidentally notified that the driving support function becomes inactive.

In S2030, since one travelable route is detected in S2010, steering assist is performed so that the self-vehicle 1 travels along the detected travelable route. Here, as described above, the computation apparatus 14 performs the steering operation in an auxiliary manner. Therefore, the assist amount (for example, auxiliary torque) of the steering operation by the computation apparatus 14 may be set so as to maintain the reference value or less. The assist amount may be set to a fixed value, or may be set to a computation value calculated based on the traveling speed of the self-vehicle 1.

In S2110, since two or more travelable routes are detected in S2010, a branching position (or a branching point) is specified on the assumption that the branching of the travelable route is detected, and a position before the branching position by a predetermined distance is set as an assist suppression position to be described later.

In S2120, the steering assist is suppressed at the assist suppression position set in S2110. Here, the assist amount of the steering operation by the computation apparatus 14 is variable, and the suppression of the steering assist may be performed so that the assist amount decreases with time.

Here, the assist suppression position may be expressed as a steering operation assist suppression position, a steering assist suppression position, or the like. The assist suppression position may be set based on the traveling speed of the self-vehicle 1. For example, when the vehicle speed is relatively small, the assist suppression position may be set so that the distance to the branching position decreases, and when the vehicle speed is relatively large, the assist suppression position may be set so that the distance to the branching position increases. Alternatively, the assist suppression position may be set so that a time until the self-vehicle 1 reaches the branching position satisfies a reference.

In S2130, it is determined whether or not a condition for resuming the steering assist is satisfied. Although details will be described later, the condition includes one or more items that can specify one of the two or more travelable routes detected in S2010. When any one of the one or more items is satisfied, it is determined that the above condition is satisfied, and the process proceeds to S2140 (Yes determination), and otherwise, the process returns to S2130 (No determination). Note that, when the above condition is not satisfied for a predetermined time, it is determined that the steering assist cannot be resumed, this flowchart is ended, and it may be incidentally notified that the driving support function becomes inactive.

In S2140, although details will be described later, one of the two or more travelable routes detected in S2010 is specified based on content of the item determined to satisfy the condition in S2130.

In S2150, the steering assist is resumed so that the self-vehicle 1 travels along the travelable route specified in S2140, and then the process returns to S2010. Note that the resuming of the steering assist may be performed so that the assist amount of the steering operation by the computation apparatus 14 increases with time and returns to the reference value.

When the driver inputs an operation indicating an intention of selecting one of the two or more travelable routes to the driving operation unit 12 as the determination condition in S2130, one of the two or more travelable routes can be specified. Therefore, examples of the item satisfying this condition include that a steering operation for causing the self-vehicle 1 to go straight or changing the traveling direction of the self-vehicle 1 is input to the steering operator 123, that an operation indicating that the traveling direction of the self-vehicle 1 is changed is input to the direction indicator 124, and that an operation amount input to the acceleration operator 121 is maintained or increased. That is, before and after the self-vehicle 1 passes through the assist suppression position (at least the closer the self-vehicle 1 gets to the branching position), there is a high possibility that some operation is input to the driving operation unit 12. Therefore, in such a case, it can be determined that the condition for resuming the steering assist is satisfied. In this case, in S2140, one of the two or more travelable routes corresponding to the operation input to the driving operation unit 12 can be selected and specified.

Another example of the item that satisfies the determination condition in S2130 is that a predetermined period elapses after the self-vehicle 1 passes through the assist suppression position and/or that the self-vehicle 1 travels a predetermined distance after passing through the assist suppression position. That is, after the self-vehicle 1 passes through the assist suppression position (at least after passing through the branching position), there is a high possibility that the self-vehicle 1 travels along any travelable route. Therefore, in such a case, it can be determined that the condition for resuming the steering assist is satisfied. In this case, in S2140, one of the two or more travelable routes having the closest distance to the traveling position of the self-vehicle 1 can be selected and specified.

In each example of FIGS. 3A to 3C, in a case where a total of two travelable routes including a route RT1 for a straight line and a route RT2 for a right turn are detected in S2010:

when a steering operation for changing the traveling direction of the self-vehicle 1 to the right side is input to the steering operator 123, the route RT2 for the right turn can be selected and specified as the travelable route;

when an operation indicating that the traveling direction of the self-vehicle 1 is changed to the right side is input to the direction indicator 124, the route RT2 for the right turn can be selected and specified as the travelable route;

when the operation amount input to the acceleration operator 121 is maintained or increased, the route RT1 for the straight line can be selected and specified as the travelable route; and when a predetermined period elapses after the self-vehicle 1 passes through the assist suppression position and/or when the self-vehicle 1 travels a predetermined distance after passing through the assist suppression position, one of the routes R1 and R2 to which the traveling position of the self-vehicle 1 is closer can be selected and specified as the travelable route.

In this way, in S2140, it is possible to specify one appropriate route of the two or more travelable routes, and in S2150, it is possible to resume the steering assist so that the self-vehicle 1 travels along the specified travelable route.

Figure 4:
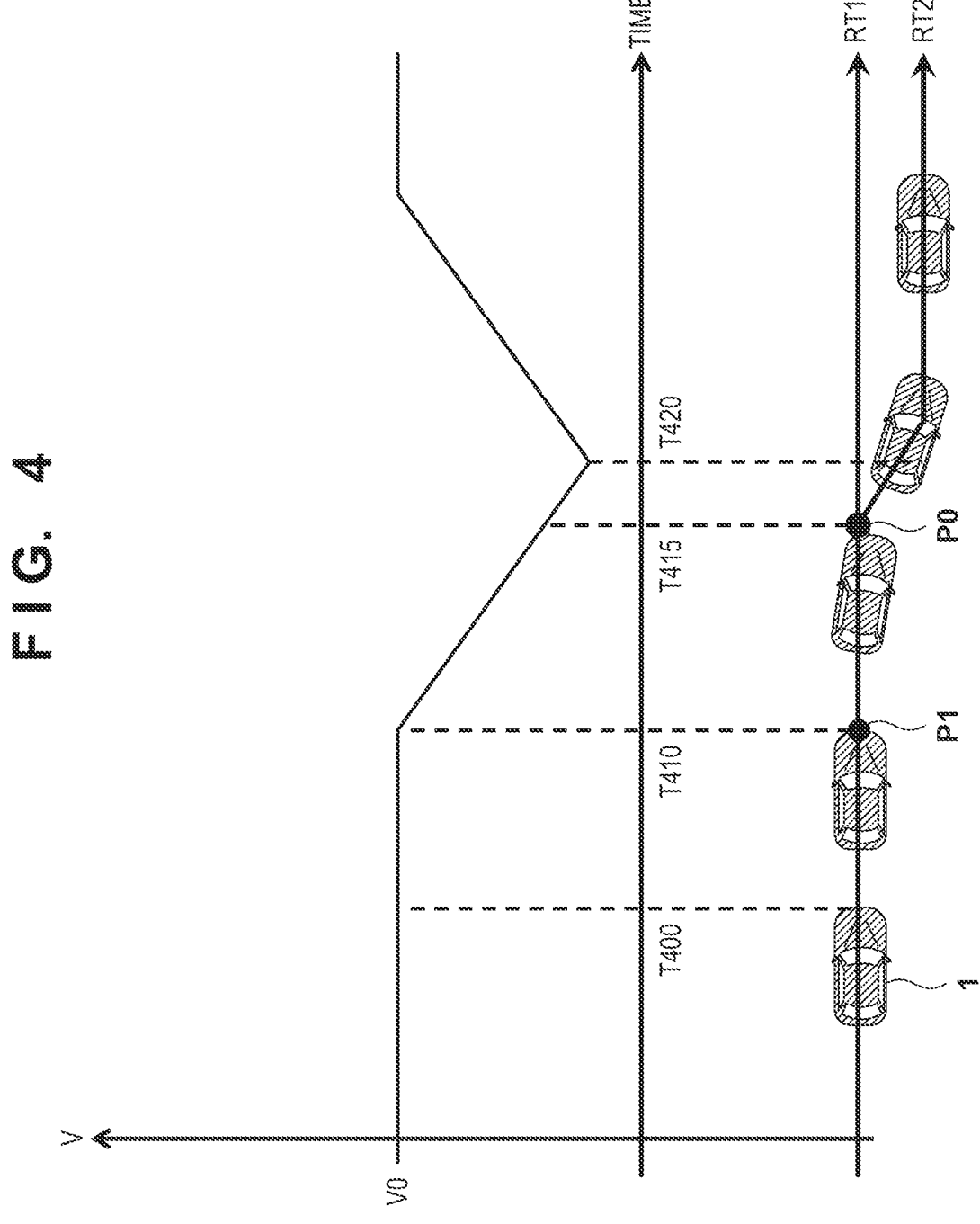
FIG. 4 is a timing chart illustrating an example of a change mode of an assist amount at the time of steering assist.

FIG. 4 is a timing chart illustrating an example of a change mode of an assist amount V of the steering operation by the computation apparatus 14. For reference, the travelable routes RT1 and RT2 and the behavior of the self-vehicle 1 are illustrated in the drawing.

It is assumed that branching of the travelable route is detected by the computation apparatus 14 at time T400 (here, it is assumed that the travelable route branches into two sections), the self-vehicle 1 reaches an assist suppression position P1 at time T410, and one of the two travelable routes is specified by the computation apparatus 14 at time T420.

It is assumed that the assist amount V is maintained at a fixed value V0 until the time T400. Thereafter, the assist amount V starts decreasing at the time T410 when the self-vehicle 1 reaches the assist suppression position P1, and starts increasing so as to return to an original value at the time T420 when one travelable route is specified. Note that a rate of change when the assist amount V decreases from the time T410 and a rate of change when the assist amount V increases from the time T420 are both constant, but one or both of them may not be constant or they may be different from each other.

Here, it is assumed that the specification of one travelable route at the time T420 is performed based on an operation input to the driving operation unit 12 by the driver at time T415. At the time T415, the assist amount V decreases. Therefore, even if the steering assist by the computation apparatus 14 is different from the driver's intention, the driver can relatively easily correct the steering assist, and the burden of the driving operation that may occur to the driver can be reduced. The burden mentioned herein may include not only a physical burden caused by the driver's driving operation being hindered but also a mental burden such as a feeling of discomfort.

Note that the time T415 and the time T420 may be substantially matched with each other, but may be actually different from each other by a time required for computational processing in the computation apparatus 14, signal communication in the vehicle 1, and the like. In addition, the time T415 may be substantially matched with the time at which the self-vehicle 1 reaches the branching position P0, but they may be actually different from each other by a time corresponding to other elements such as the technique of the driving operation by the driver and the size of the vehicle body of the self-vehicle 1.

As described above, according to the present embodiment, the computation apparatus 14 detects a travelable route on which the self-vehicle 1 can travel, and when branching of the travelable route is detected, the computation apparatus 14 suppresses the steering assist until one of two or more travelable routes generated by the branching is specified. Therefore, according to the present embodiment, the driver can appropriately input the steering operation to the steering operator 123, and it is possible to reduce the burden of the driving operation that may occur to the driver when the travelable route branches into two or more sections.

In addition, the suppressed steering assist is appropriately resumed based on the operation input to the driving operation unit 12 before and after the self-vehicle 1 passes through the assist suppression position, and the elapsed period and/or the traveling distance after the self-vehicle 1 passes through the assist suppression position. Therefore, the present embodiment can be advantageous for further reducing the burden of the driving operation of the driver.

The above-described control for the steering assist is described with reference to the case where the lane on which the self-vehicle 1 is traveling branches from one to two or more sections, but is also applicable to a case where the road environment in which the self-vehicle 1 is traveling includes two or more lanes. That is, the above-described control may be performed on a traveling target lane of the self-vehicle 1.

In addition, as another embodiment, the above-described control may be performed even in a case where the number of lanes increases due to branching of a lane that is not a traveling target among two or more lanes of the road environment in which the self-vehicle 1 is traveling. As an example, in a road environment of a total of two lanes of the right lane and the left lane, there is a case where a total of three lanes are formed due to branching of the right lane while the self-vehicle 1 is traveling on the left lane. In such a road environment, for example, when a degree of familiarity of the driver with the region is low, it is often difficult to determine the intention of the driver. Therefore, even in such a road environment, the above-described control can be advantageous for further reducing the burden of the driver's driving operation.

Note that the degree of familiarity indicates a degree of driver's understanding of the road environment or the details of the road environment in the region. Since the degree of familiarity is said to be high in a familiar region, it can also be expressed as a degree of intimacy or the like.

Incidentally, there is a case where it is relatively difficult to detect or specify the above-described travelable route and its branch on an actual general road, and this may also cause an increase in processing load of the computation apparatus 14. Therefore, in such a case, the driving operation may be entrusted to the driver even when the driving support function of the vehicle 1 is active, that is, the steering assist described above may be resumed in response to satisfaction of a predetermined condition after being temporarily suppressed.

On the other hand, even in a traveling environment other than the general road, it may be relatively easy to detect or specify the above-described travelable route and its branch. In such a case, the driving support function of the vehicle 1 is preferably utilized.

These will be explained as follows by exemplifying some cases.

First Case

Figure 5:
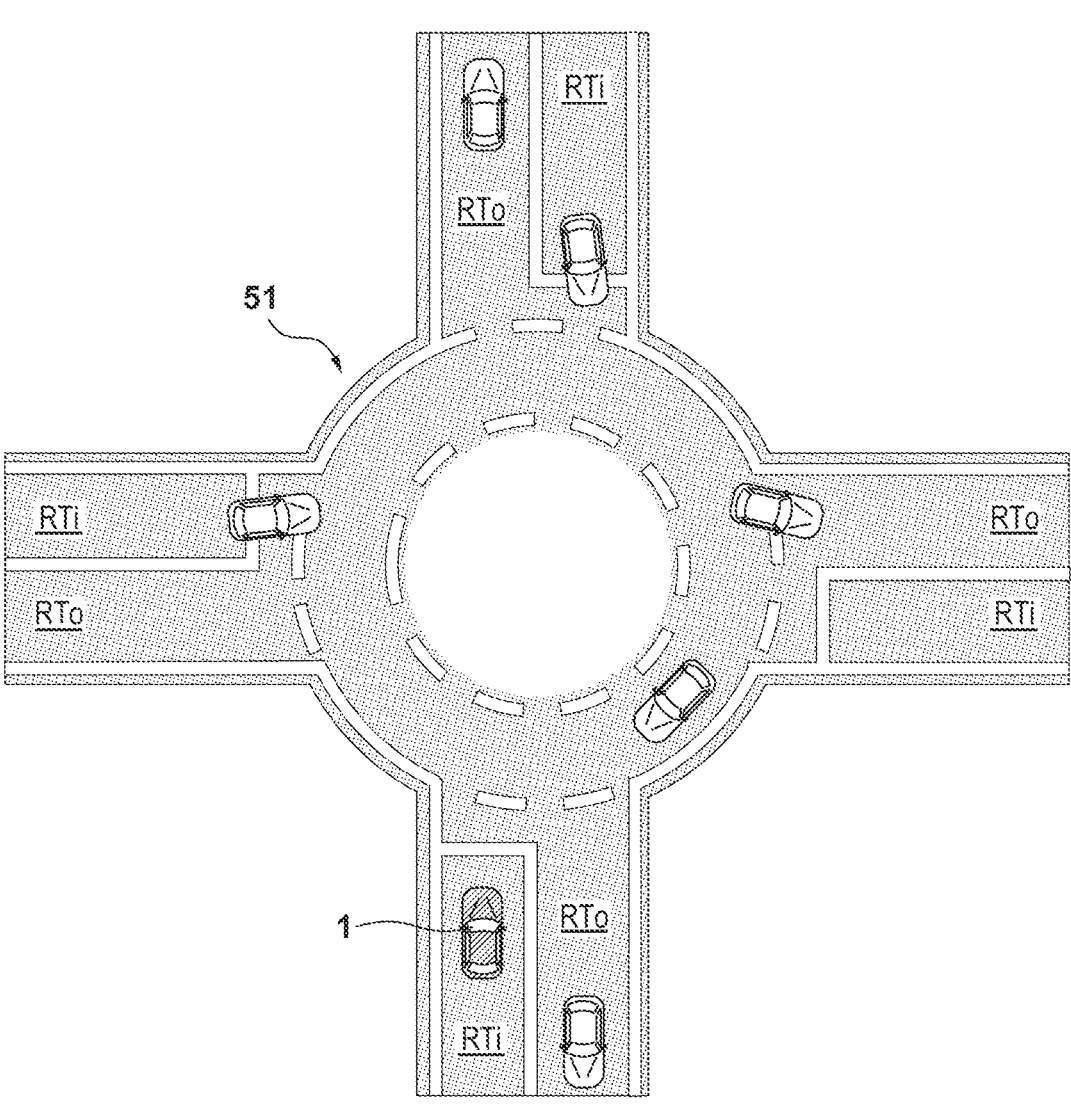
FIG. 5 is a schematic top view of a traveling environment including an annular intersection.

FIG. 5 is a schematic top view of a traveling environment including an annular intersection 51. While the self-vehicle 1 turns along one direction in the annular intersection 51, typically, one travelable route can be detected, but since a plurality of introduction routes RTi to the annular intersection 51 and a plurality of derivation routes RTo from the annular intersection 51 are mixed, the specification in S2140 may be difficult. Therefore, while the self-vehicle 1 turns along one direction in the annular intersection 51, one of the plurality of derivation routes RTo is preferably selected by the driver. Therefore, in the annular intersection 51, the steering assist may be suppressed until the self-vehicle 1 passes through the annular intersection 51 after the self-vehicle 1 passes through the assist suppression position, and the suppressed steering assist may be resumed after the self-vehicle 1 passes through the annular intersection 51 (after completion of the passage).

According to such a case, the steering assist is suppressed until a predetermined condition is satisfied based on the detection of the travelable route or the specific degree of difficulty, and the burden of the driving operation that may occur to the driver can be relatively easily reduced.

Second Case

Figure 6:
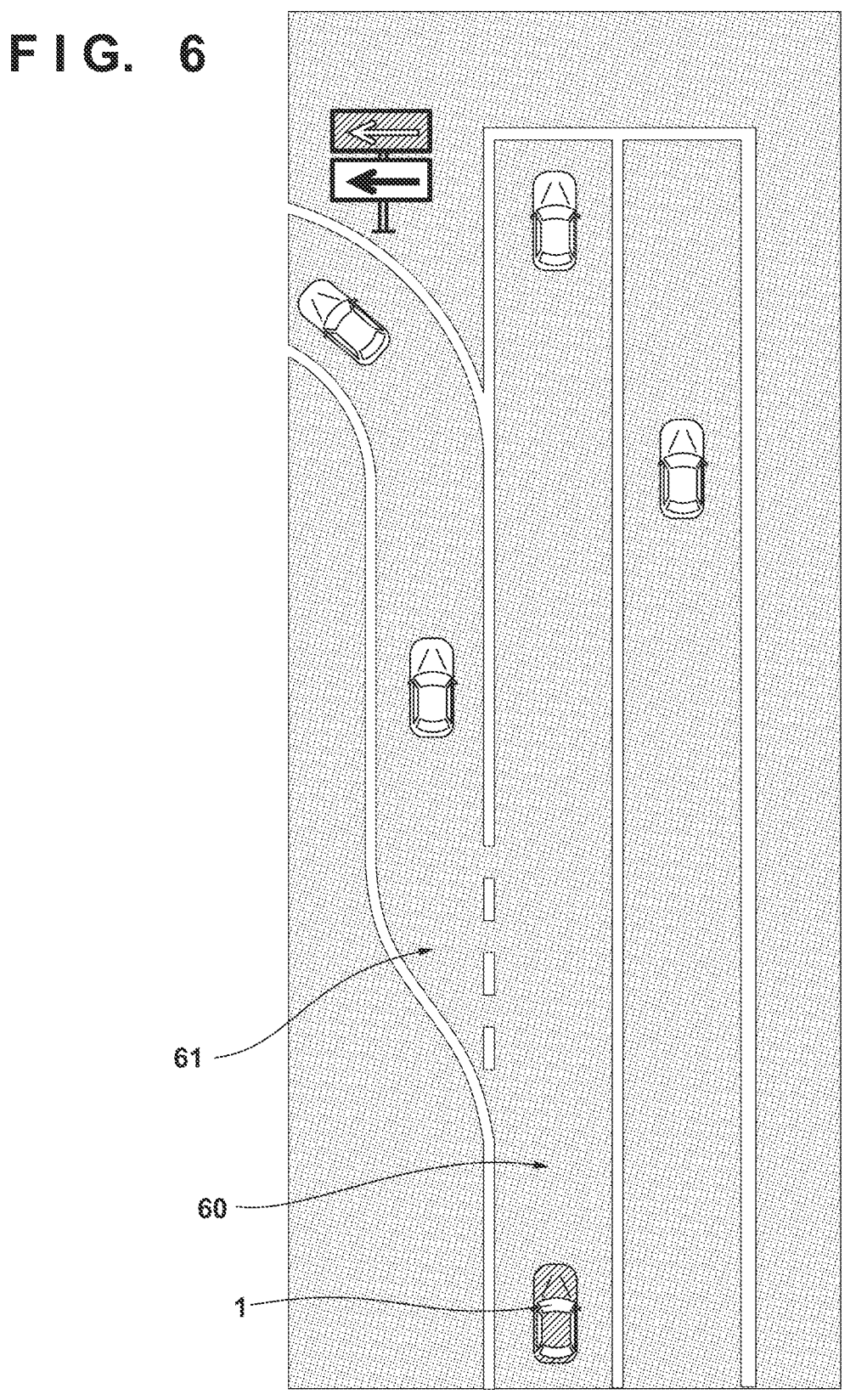

FIG. 6 is a schematic top view of a traveling environment including a left-turn channel 61. The left-turn channel 61 is a branch road that branches from a main lane 60 so as to be able to turn left and allows any vehicle to arbitrarily enter. Note that the left-turn channel 61 may be a right-turn channel in other regions (for example, roads in other countries).

Even when the left-turn channel 61 is detected, branching of the travelable route is detected. The left-turn channel 61 is generally provided on a large road with a relatively large traffic volume, and in this case, it is conceivable that it becomes relatively difficult for the computation apparatus 14 to detect or specify the travelable route in the vicinity of the left-turn channel 61. Alternatively, when the degree of familiarity of the driver with the region is low, it may be difficult to determine the intention of the driver. Therefore, when the left-turn channel 61 is detected, the steering assist may be resumed after the self-vehicle 1 passes through the assist suppressing position, the steering assist is suppressed, and the self-vehicle 1 further passes through the left-turn channel 61, or may be resumed with an elapsed period and/or a traveling distance longer than the determination condition in S2130.

Third Case

Figure 7:
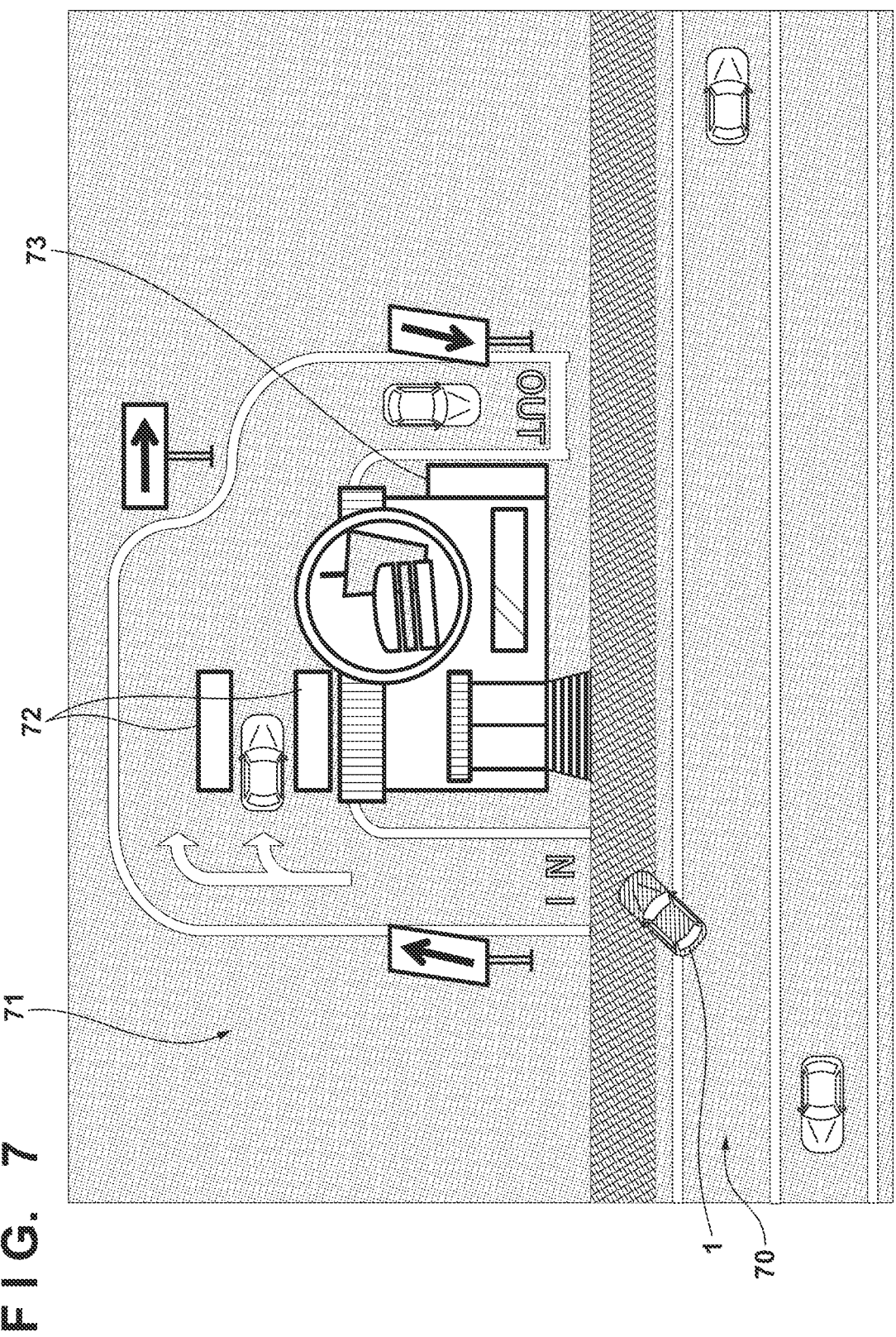

FIG. 7 is a schematic top view of a traveling environment including a drive-through 71 of a certain store. The drive-through 71 may include an order gate 72 for the driver to order a desired item and a reception gate 73 for the driver to receive the item. In the drive-through 71, the vehicle 1 may generally proceed from a lane 70 to the order gate 72 to pause, then proceed to the reception gate 73 to pause, and then return to the lane 70.

Between an entrance of the drive-through 71 and the order gate 72, a division line for guiding the vehicle to the order gate 72 is often attached even on the site of the store. Therefore, it is often relatively easy to detect or specify the travelable route by the computation apparatus 14. In such a case, the steering assist may not be suppressed, or may be resumed when the steering assist is suppressed.

Similarly, it is often relatively easy for the computation apparatus 14 to detect or specify the travelable route from the order gate 72 to the lane 70 through the reception gate 73. In such a case, the steering assist may not be suppressed, or may be resumed when the steering assist is suppressed.

On the other hand, as illustrated in FIG. 7, two or more order gates 72 may be provided. In this case, when the vehicle 1 approaches the two or more order gates 72, two or more travelable routes and branches thereof are detected by the computation apparatus 14, and the steering assist can be suppressed accordingly. The suppressed steering assist may be resumed when one of the two or more travelable routes is specified.

In the present embodiment, the determination that the annular intersection 51, the left-turn channel 61, and the drive-through 71 are detected is performed in S2020 by the image analysis using the image data acquired by the monitoring device 13, but may be detected by other means. For example, the detection may be performed based on a global positioning system (GPS) sensor and map data, or may be performed using other communication means.

As described above with reference to the first and second cases, even on the general road in which the route of the vehicle 1 is generally set, it may be relatively difficult to detect or specify the travelable route and the branch thereof. In such a case, even when the driving support function of the vehicle 1 is active, the driving operation may be entrusted to the driver, and the steering assist described above may be resumed in response to satisfaction of a predetermined condition after being temporarily suppressed.

On the other hand, as described with reference to the third case, even in a traveling environment other than the general road, the route of the vehicle 1 may be generally set, and the travelable route and the branch thereof may be relatively easily detected or specified. In such a case, the driving support function of the vehicle 1 can be utilized, and the steering assist described above may not be suppressed, and in a case where the steering assist is suppressed, the steering assist may be resumed in response to satisfaction of a predetermined condition.

Note that, although some special traveling environments are exemplified in the above-described cases, other cases where it is difficult to detect or specify the travelable route and the branch thereof may be additionally registered in the computation apparatus 14 or machine-learned by the computation apparatus 14 as appropriate. As a result, switching between suppression and resuming of the steering assist can be more appropriately controlled by the computation apparatus 14.

In addition, in the present embodiment, a mode of executing, suppressing, and resuming the steering assist as one of the driving support functions is exemplified, but the content of the present embodiment can be extended to other driving support functions. For example, when the driving support function includes a plurality of levels having mutually different degrees of driving support, the suppression of the steering assist corresponds to changing the driving support function from a high level to a low level, and the resuming of the steering assist corresponds to returning the driving support function to the high level.

In the descriptions heretofore, in order to facilitate the understanding, each element has been indicated with a name related to its functional aspect. However, each element is not limited to an element including the content that has been described in the embodiments as its main function, and may include the content as a supplementary function. Thus, each element may be replaced with a similar expression without being limited by its expression. For the same purpose, the expression "apparatus" may be replaced with "unit", "part (component, piece)", "member", "structure", "assembly" or the like, or may be omitted.

Summary of Embodiments

Some features described in the above embodiments are as follows:

[1] An on-vehicle computation apparatus (14) comprising:

a first detection unit (S2010) configured to detect a travelable route on which a self-vehicle (1) is travelable;

a second detection unit (S2130) configured to detect a driving operation input to the self-vehicle, the driving operation including a steering operation;

a steering assist unit (S2030, S2150) configured to assist the steering operation so that the self-vehicle travels along the travelable route detected by the first detection unit;

a specification unit (S2140) configured to specify one of two or more travelable routes based on the driving operation, when the two or more travelable routes are detected by the first detection unit; and a control unit (S2120) configured to control the steering assist unit and to, when the two or more travelable routes are detected by the first detection unit, suppress the assist by the steering assist unit until one of the two or more travelable routes is specified by the specification unit.

According to such a feature, it is possible to reduce the burden of the driving operation that may occur to a driver when the travelable route branches into two or more routes.

[2] The computation apparatus according to [1], wherein the driving operation further includes a direction indication operation using a direction indicator (124) of the self-vehicle, and the specification unit specifies one of the two or more travelable routes based on the direction indication operation.

According to such a feature, it is possible to relatively easily specify one of the two or more travelable routes, and to appropriately resume the assist of the steering operation.

[3] The computation apparatus according to [1], wherein the control unit sets a period during which the assist by the steering assist unit is suppressed as a first predetermined period, and after the first predetermined period elapses, the specification unit specifies one of the two or more travelable routes, and the control unit resumes the assist by the steering assist unit so that the self-vehicle travels along the specified travelable route.

According to such a feature, the assist of the steering operation can be resumed relatively easily.

[4] The computation apparatus according to [1], wherein the steering assist unit is configured to vary an assist amount of the steering operation, and the control unit suppresses the assist by the steering assist unit so that the assist amount decreases with time.

According to such a feature, the burden of the driving operation can be appropriately reduced.

[5] The computation apparatus according to [1], wherein the first detection unit detects the two or more travelable routes based on a road sign and/or a road marking.

According to such a feature, the branching of the travelable route can be relatively easily detected.

[6] The computation apparatus according to [1], wherein the first detection unit detects the two or more travelable routes based on a lane width in which the self-vehicle travels.

According to such a feature, the branching of the travelable route can be relatively easily detected.

[7] The computation apparatus according to [1], wherein the first detection unit detects the two or more travelable routes based on a traveling mode of one or more preceding vehicles traveling in front of the self-vehicle.

According to such a feature, the branching of the travelable route can be relatively easily detected.

[8] The computation apparatus according to [1], wherein the first detection unit detects the two or more travelable routes by detecting two or more order gates (72) in a drive-through (71).

According to such a feature, the branching of the travelable route can be relatively easily detected.

[9] The computation apparatus according to [8], wherein the control unit does not suppress the assist by the steering assist unit based on the order gate (72).

According to such a feature, the burden of the driving operation can be appropriately reduced.

[10] The computation apparatus according to [1], wherein the first detection unit detects the two or more travelable routes by detecting an intersection.

According to such a feature, the branching of the travelable route can be relatively easily detected.

[11] The computation apparatus according to [10], wherein when the intersection is an annular intersection (51), the control unit resumes the assist by the steering assist unit after the self-vehicle passes through the annular intersection.

According to such a feature, the assist of the steering operation can be resumed relatively easily.

[12] The computation apparatus according to [1], wherein the first detection unit detects the two or more travelable routes by detecting a left-turn channel (61).

According to such a feature, the branching of the travelable route can be relatively easily detected.

[13] The computation apparatus according to [12], wherein the control unit resumes the assist by the steering assist unit after the self-vehicle passes through the left-turn channel.

According to such a feature, the processing load of the computation apparatus can be appropriately reduced.

[14] A vehicle (1) comprising:

the computation apparatus according to [1]; and a monitoring device (13) configured to monitor a traveling environment of the self-vehicle.

That is, the on-vehicle computation apparatus according to the embodiment can be applied to a vehicle having a driving support function that performs driving support based on a traveling environment.

The invention is not limited to the foregoing embodiments, and various variations/changes are possible within the spirit of the invention.

What is claimed is:

1. An on-vehicle computation apparatus comprising at least one processor circuit with a memory comprising instructions that cause, when executed, the at least one processor circuit to perform at least:

a first detection of detecting a travelable route on which a self-vehicle is travelable;

a second detection of detecting a driving operation input to the self-vehicle, the driving operation including a steering operation;

a steering assist of assisting the steering operation so that the self-vehicle travels along the travelable route detected by the first detection;

a specification of specifying one of two or more travelable routes based on the driving operation, when the two or more travelable routes are detected by the first detection; and a control of controlling the steering assist and to, when the two or more travelable routes are detected by the first detection, suppress the assist by the steering assist until one of the two or more travelable routes is specified by the specification.

2. The computation apparatus according to claim 1, wherein the driving operation further includes a direction indication operation using a direction indicator of the self-vehicle, and the specification specifies one of the two or more travelable routes based on the direction indication operation.

3. The computation apparatus according to claim 1, wherein the control sets a period during which the assist by the steering assist is suppressed as a first predetermined period, and after the first predetermined period elapses, the specification specifies one of the two or more travelable routes, and the control resumes the assist by the steering assist so that the self-vehicle travels along the specified travelable route.

4. The computation apparatus according to claim 1, wherein the steering assist varies an assist amount of the steering operation, and the control suppresses the assist by the steering assist so that the assist amount decreases with time.

5. The computation apparatus according to claim 1, wherein the first detection detects the two or more travelable routes based on a road sign and/or a road marking.

6. The computation apparatus according to claim 1, wherein the first detection detects the two or more travelable routes based on a lane width in which the self-vehicle travels.

7. The computation apparatus according to claim 1, wherein the first detection detects the two or more travelable routes based on a traveling mode of one or more preceding vehicles traveling in front of the self-vehicle.

8. The computation apparatus according to claim 1, wherein the first detection detects the two or more travelable routes by detecting two or more order gates in a drive-through.

9. The computation apparatus according to claim 8, wherein the control does not suppress the assist by the steering assist based on the order gate.

10. The computation apparatus according to claim 1, wherein the first detection detects the two or more travelable routes by detecting an intersection.

11. The computation apparatus according to claim 10, wherein when the intersection is an annular intersection, the control resumes the assist by the steering assist after the self-vehicle passes through the annular intersection.

12. The computation apparatus according to claim 1, wherein the first detection detects the two or more travelable routes by detecting a left-turn channel.

13. The computation apparatus according to claim 12, wherein the control resumes the assist by the steering assist after the self-vehicle passes through the left-turn channel.

14. A vehicle comprising:

the computation apparatus according to claim 1; and a monitoring device configured to monitor a traveling environment of the self-vehicle.

* * * * *